March 9, 1926. 1,576,049
G. L. HOGAN
APPARATUS FOR TRANSMITTING COPIES
Filed April 18, 1923
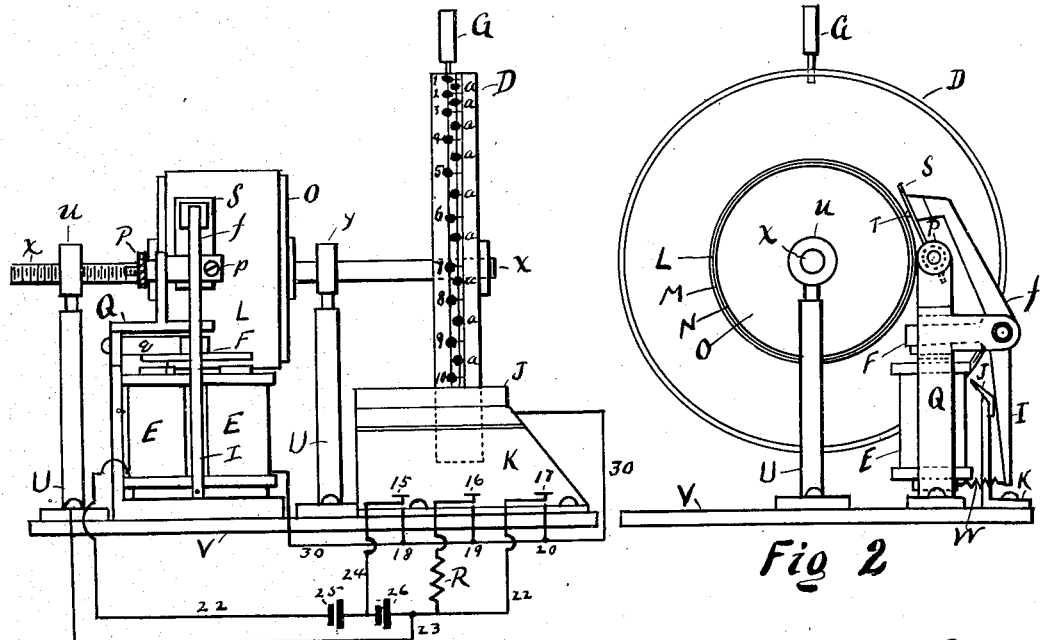
Fig 2
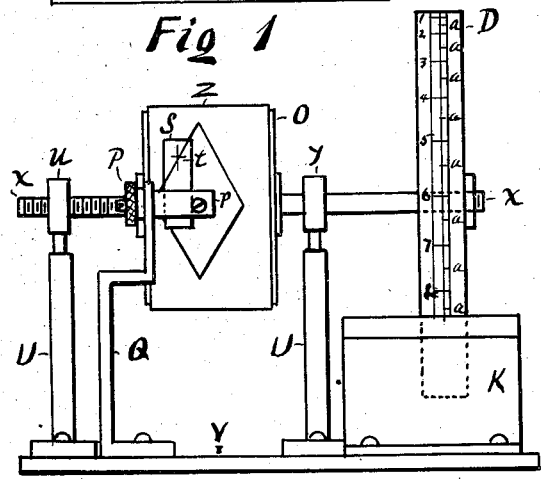
Fig 1
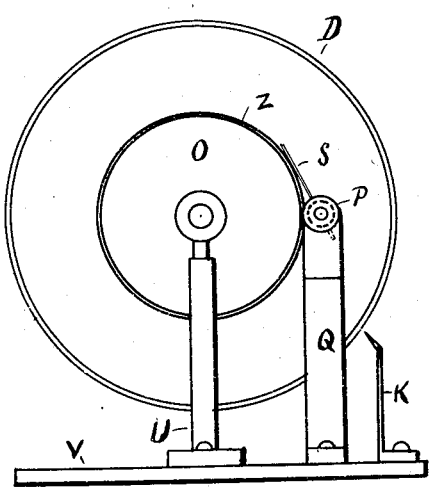
Fig 3
Fig 4
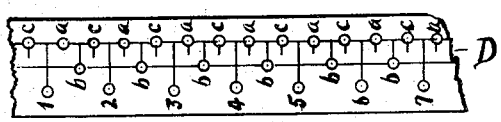
Fig 5
George. Lewis. Hogan
Inventor Patented Mar. 9, 1926.

1,576,049

UNITED STATES PATENT OFFICE.

GEORGE LEWIS HOGAN, OF CHICAGO, ILLINOIS.

APPARATUS FOR TRANSMITTING COPIES.

Application filed April 18, 1923. Serial No. 633,026.

*To all whom it may concern:*

Be it known that I, GEORGE LEWIS HOGAN, a citizen of the United States, residing at 5110 Kenwood Avenue, Chicago, in the county of Cook and State of Illinois, have invented a new and useful Apparatus for Transmitting Copies, of which the following is a specification.

My invention relates to improvements in apparatus for the transmission of copies whereby the outlines of the figure to be transmitted are divided into a series of sections or dots and their respective positions registered or expressed in terms of figures or characters or both on a graduated index, and which may be recorded or written or listed and then or at a future time transmitted from the sending station by radio, telephone, telegraph or other signals to the receiving station where they may be recorded in this form and subsequently converted into a copy of the picture at the receiving station by means of a receiving device constructed alike or proportional in all respects of movement to the sending device, or the same may be so converted into such copy singly as received. This system reduces to a minimum the actual time consumed in monopolizing the radio broadcasting station or the electrical wire or other means used for transmitting as the case may be.

I attain the object of my invention by providing a sending and a receiving mechanism capable of identical or proportionate relative motions in their operative parts, and having identical or proportional holders for the picture to be transmitted and the copy to be made respectively. The sending holder is in operative relation with a tracing stylus or point or equivalent and the receiving holder is in operative relation with a stylus point or equivalent for recording in such manner that the paths of the tracing point and recording point will be respectively alike or proportional in every way, and capable of transversing a motion to be imparted to such respective holders. These holders may be capable of two motions in transverse directions to each other, such as a rotary motion and a lateral motion, transverse to such rotary motion, and in operative relation with a fixed, tracing and recording stylus or point respectively, the paths of which are spirals, or they may be capable of only a rotary movement in operative relation with respective stylus having a transverse movement, and they may be either cylindrical or of disc form and still be within the scope of my invention. If such holders are of disc form the paths of the stylus would be convolute.

I also provide identical or proportional graduated index systems in operative relation, respectively, with the sending and receiving device in such manner that the respective readings of one or more positions of the sending tracer or stylus are identical with the readings of the receiving index when such respective positions, or series of positions respecting each other, are identical or proportionate in the sending and receiving device.

The recording stylus or point of the receiving device may be either a pencil point or a point that will leave an impression when brought into contact with a suitable object or a hard point which may press against a sheet of carbon or transfer paper or equivalent and transfer such impression to a sheet of suitable material in contact with such transfer paper and such pressure may be wrought by the hand but I prefer to use an electro-magnetic device for such purpose and also means for varying the electro-motive force of the current exciting such device for the purpose of varying the degrees of shading. I also prefer to perforate the index dial of the receiving device at each graduation and to have a metallic pin to engage such perforation in a removable way, and in such manner that when the dial is revolved, the pin will contact with an indicator that marks the reading and close an electric circuit that will operate such electro-magnetic device and bring pressure upon the recording stylus point at such reading of the index. The tracing point or stylus may be any sort of indicator but I prefer to use a transparent strip of preferably flexible material such as celluloid or mica, having a dot or cross-mark for indicating as such transparency prevents the obstruction of vision and gives the operator a clear view of the portion of the picture being transmitted. I also prefer to index the graduations of the index dials by dividing them first into units and then subdividing each unit into fractions and to assign to the units index of a different classification to the index or indices assigned to the fractional graduations, such as indicating the units by numbers and the fractional graduations by alphabetical characters or vice versa; this prevents confusion in taking fractions or numbers when calling off or transmitting and is very essential in this invention.

In order to better describe my invention, I refer to the accompanying drawing in which like figures and letters represent like or similar parts throughout each drawing.

Fig. 1 is a front view of the device fitted with an electromagnetic recording point and perforated, graduated index dial, showing conventionally the electrical arrangement for operating the recording stylus point at the receiving station.

Fig. 2 is an end view of the device for receiving.

Fig. 3 is a front view of the device fitted with a tracing point or stylus and a graduated index dial mechanism for sending.

Fig. 4 is an end view of the device for sending.

Fig. 5 shows a developed section of the graduated dial having graduations of a finer degree and the method of indexing such graduations and perforations corresponding thereto in the receiving dial.

The base (V), the standards (U—Q) constitute the frames of each respective device.

In Figs. 1 and 2 (O) is a cylinder mounted on a shaft (X) threaded on a portion to engage a threaded bearing ($u$) and to feed through the bearing (Y) allowing it a rotary motion with the shaft (X) and a lateral motion actuated by the thread of the screw portion of (X). The cylindrical dial (D) is graduated and indexed (1ª—2ª—3ª etc.) preferably with corresponding perforations (1ª—2ª—3ª etc.) and attached to the shaft (X). (J)—(K) constitute an indicator, the portion (K) of which being preferably a di-electric and the portion (J) an electric conductor; (G) is a metalic pin capable of removably engaging the perforations (1ª—2ª—3ª etc.); (N) is a sheet of paper upon which copy is to be made; (M) is a sheet of transfer or carbon paper; (L) is a sheet of paper or equivalent, placed over the carbon paper to protect it against direct contact with the recording point ($t$) of the stylus (S), which is preferably a strip of suitable material capable of moving to and from the cylinder (O) and supported by the member (P—$p$) which is preferably slotted at ($p$). The finger ($f$) is operated and connected to or in operative relation with the armature (F) of the electromagnet (E) in opposition to the action of the spring (W) and may be either attached or detached to or from the stylus point ($t$) and may, if so desired, be actuated by hand or any suitable pressure. (25—26) are respective electric batteries or sources of electrical energy, (R) is a resistance coil, (15—16—17) are circuit closers, (22—23—30) are respective wiring connections of the batteries (25—26), electro-magnet (E), the indicator (J) and the frame of the machine (V—U—Q), the circuit being completed through such frame to the index disc or dial (D).

Fig. 3 is a front view of the device fitted with a tracing stylus (S) which is preferably of transparent material and flexible or capable of a movement to and from the cylinder holder (O) and, on which or in operative relation with which is a point or cross ($t$). The cylinder holder (O) is attached to the axis ($x$), a portion of which is threaded to engage a corresponding thread in the bearing (U) which thread is also a corresponding and proportionate thread to that of the receiving device, and the graduated dial (D) of the sending device is a replica of the graduated dial (D) of the recording or receiving device, (K) is an index pointer, (Z) is a sheet showing a sketch to be transmitted, which may be fastened around the cylinder (O) by an adhesive or otherwise.

The operation of my invention is as follows: The diamond illustration in Figs. 3 and 4 to be transmitted is fastened around the cylinder holder (O) and the dial turned until the cross mark on (S) is at the starting point of the illustration and then the dial is turned in one direction only and continually until every portion of such illustration has been covered and every time the cross ($t$) intersects a line the dial is read at its indicator and such reading written down or recorded in list form; for instance, the reading at the point of illustration is (8ª); when the picture has been entirely traced the operator will have a list of numbers representing each intersection. The operator next takes the list and transmits it by radio broadcasting or telephone or otherwise to the distant station and there the operator simply turns the recording dial or receiving dial in one continual direction registering consecutively the list of numbers and characters so transmitted and on each registration brings pressure on the stylus (S—$t$), and such stylus thus operated will reproduce the picture perfect in every way and of the same size, provided that the operative parts of the sending and receiving devices are of the same dimensions, but in my invention I may make the sending cylinder (O) twice as large as the receiving cylinder (O) and have twice as many threads per inch in operative relation to the receiving device as there are in the sending device, and such would cause the picture to be received in one-half size and such arrangement would increase accuracy because a larger picture could be used in tracing and consequently more details given. The machine may be constructed in any desired proportions. Accuracy may also be increased by enlargement of the size of the dials (D) and by graduating them to a finer degree than illustrated in the accompanying drawing, but a graduation as illustrated in Fig. 5 where each unit is sub-divided into four sections and working in connection with a screw feed of 40 to 60 threads per inch will give splendid results, and good enough for all practical purposes.

Where it is desired to transmit and reproduce shaded effects the circuit closers (15—16—17) Fig. 1 are brought into use and will be indicated on the list as light, medium and dark respectively for by closing contact (15) one cell of battery will excite electro-magnet (E) and by closing (16) two cells through the resistance (R) and by closing (17) two cells without resistance will operate the electro-magnet (E), thus giving three stages of pressure on the stylus (t) and three corresponding stages of shading and by using more batteries, resistance coil and circuit closers, a more elaborate system of shading can be produced, and for simplicity in transmission each degree of shading should be indicated by an alphabetic letter that has no sound similar to that of any of the figures used for the purpose of preventing confusion.

While I have described the operation of my invention by first listing the readings and subsequently sending the entire list to the receiving station, it is obvious that such reading may be sent and recorded as taken and by the use of the pin (G) and indicator (J), Fig. 1 the recorder may be made to work automatically by placing (G) in the perforation of the reading on the disc (D) and turning such disc dial until (G) contacts with (J) and closes the electric circuit operating (E) and the stylus point (t).

Having thus described my invention, I claim—

1. An apparatus for the transmission of copies consisting of a sending device and a receiving device each having a rotary holder capable of a transverse movement in threaded bearings for holding respectively a picture or sketch, and a sheet upon which such copy is to be reproduced and each in operative relation with a respective stylus and index system whereby one or more positions of the sending stylus may be registered in terms of such index system transmitted by sound reproductions or signals, and duplicated by the receiving stylus and its corresponding index system in such manner that such relative position on respective apparatus will be identical or proportional in all respects to each other.

2. An apparatus for the transmission of copies consisting of a sending device and a receiving device each having a rotary holder capable of a transverse movement in threaded bearings for holding respectively a picture or sketch and a sheet upon which such copy is to be reproduced and each in operative relation with a respective stylus and an index system comprising an indicator in operative relation with a dial graduated into units and fractional parts of units such units being indexed by different classifications of characters than the indices of such fractional portions of such units; such as numbers for the units and alphabetic letters for the fractional parts thereof, whereby one or more positions of the sending stylus may be registered in terms of such index system transmitted by sound reproduction or signals and duplicated by the receiving stylus with its corresponding index system in such manner that such relative positions on each respective apparatus will be identical or proportional in all respects to each other.

3. An apparatus for the transmission of copies by sound reproduction or signals consisting of a sending device and a receiving device each having a rotary holder capable of a transverse movement in threaded bearings for holding respectively a sketch or picture and a sheet upon which such copy is to be reproduced such holders in operative relation with a respective stylus or indicator in such manner that the path of such stylus or indicator is in spiral or convolute with respect to its respective such holders and the respective paths of such stylus in the sending and receiving machine are the same or in direct proportion to each other and an index dial similarly or proportionately graduated in operative relation with each of such respect holders and an index pointer in operative relation with each of such respective dials.

4. An apparatus for the transmission of copies by sound reproduction or signals consisting of a sending device and a receiving device each having rotary holders capable of transverse movements in threaded bearings for holding respectively a sketch or picture and a sheet upon which copy is to be reproduced such respective holders in operative relation with a respective stylus in such manner that the path of such stylus is a spiral with respect to its respective cylindrical holder and the respective path of such stylus in the sending and receiving machine are identical or proportional spirals around such respective holders and means for imparting or releasing pressure to the stylus of the receiving machine to or from its cylindrical copy holder, an index dial exactly or proportionaly graduated with respect to each other in operative relation with each of such respective cylindrical holders and an index pointer in operative relation with each of such respective index dials.

5. An apparatus for the transmission of copies by sound reproduction or signals consisting of a sending device and a receiving device each having cylindrical holders for holding respectively a sketch or picture and a sheet upon which such copy is to be reproduced, such holders capable of a rotary motion and each in operative relation with a respective stylus or indicator having a movement parallel to the axis of such cylindrical holder, such movement being actuated by mechanism connected with such holder in such manner that the paths of the stylus of the sending and receiving machine are identical or proportional spirals around such respective cylindrical holders and means for imparting or releasing pressure to the stylus of the receiving machine to or from its cylindrical copy holder and index dials exactly or proportionately graduated with respect to each other in operative relation respectively with each of such cylindrical holders and an index pointer in operative relation with each of such index dials.

6. An apparatus for the transmission of copies by sound reproduction or signals consisting of a sending and a receiving device each having a rotary holder for holding respectively a sketch or picture and a sheet upon which such copy is to be reproduced and each having a stylus or indicator with a movement in a transverse direction to the movement of its respective rotary holder and each actuated by the same mechanism of its respective device in such manner that the path of each stylus or indicator with respect to the rotary holder of such device is identical or proportionate to the other and in operative relation with respective index systems whereby a multiplicity of positions of the sending stylus or indicator may be duplicated by the receiving stylus or indicator with respect to each other and their respective rotary holders of such devices.

7. An apparatus for the transmission of copies by sound reproduction or signals consisting of a sending device and a receiving device each having a rotary holder for holding respectively a picture or sketch and a sheet upon which such copy is to be reproduced and each capable of a predetermined movement in a transverse direction to its rotary movement and each in operative relation with a respective tracing and recording stylus and a respective equal or proportionately graduated index dial having respective indicators, such tracing stylus being of a transparent material in close proximity to such sending holder and means on such tracing stylus for defining a point to operate in such manner that the position of such point may be registered in terms of such graduated dial and reproduced on such receiving device by adjustment of its graduated dial to corresponding indices and means for recording such point by such recording stylus.

8. An apparatus for the transmission of copies by sound reproduction or signals consisting of a sending device and a receiving device each having a rotary holder for holding respectively a picture or sketch and a sheet upon which such copy is to be reproduced and each capable of a predetermined movement in a transverse direction to its rotary movement and each in operative relation with a respective tracing and recording stylus and a respective equal or proportionately graduated index dial having respective indicators, such tracing stylus being of a flexible transparent material in close proximity to such sending holder and means on such tracing stylus for defining a point to operate in such manner that the position of such point may be registered in terms of such graduated dial and reproduced on such receiving device by adjustment of its graduated dial to corresponding indices and means for recording such point by such recording stylus.

9. An apparatus for the transmission of copies consisting of a sending device and a receiving device each having a rotary holder for holding respectively a picture or sketch and a sheet or sheets and a sheet of carbon paper or equivalent in operative relation and each such rotary holder capable of a predetermined movement in a transverse direction to its rotary movement and each in operative relation with a respective tracing and recording stylus and a respective equal or proportionately graduated index dial in operative relation with respective indicators and variable electro-magnetic means for varying the pressure of such recording stylus towards such rotary holder and index means for predetermining the position of such stylus.

10. An apparatus for the transmission of copies consisting of a sending device and a receiving device each having a rotary holder for holding respectively a picture or sketch and a sheet or sheets and a sheet of carbon paper or equivalent in operative relation and each such rotary holders capable of a predetermined movement in a transverse direction to its rotary movement and each in operative relation with a respective tracing and recording stylus and a respective equal or proportionately graduated index dial with perforations opposite each graduation and a metallic pin capable of entering such perforations and a metallic indicator in such manner that when such pin is inserted in and pressed against such indicator that it will close an electric circuit in operative relation with electro-magnetic means for causing pressure upon such recording stylus and such indicator will act as a stop to such index dial for determining the position of such recording stylus.

GEORGE LEWIS HOGAN.